United States Patent [19]

Gordon et al.

[11] 3,842,366

[45] Oct. 15, 1974

[54] DOUBLE DISCHARGE, LARGE VOLUME EXCITATION GAS LASER

[75] Inventors: Richard Lee Gordon, Richland; Errol V. Allen, Benton City, both of Wash.

[73] Assignee: Battelle Memorial Institute, Columbia, Ohio

[22] Filed: Mar. 12, 1973

[21] Appl. No.: 340,541

[52] U.S. Cl. ............................................. 331/94.5
[51] Int. Cl. ............................................. H01s 3/09
[58] Field of Search ................................. 331/94.5

[56] References Cited
UNITED STATES PATENTS 3,666,982   5/1972   Wiegand, Jr. .................. 331/94.5
3,772,610   11/1973  Foster et al. .................. 331/94.5

*Primary Examiner*—William L. Sikes
*Attorney, Agent, or Firm*—Klarquist, Sparkman, Campbell, Leigh, Hall & Whinston

[57] ABSTRACT

A transversely excited atmospheric pressure gas laser of double discharge type is described in which a starter gas of different composition than the laser gas is employed in the first discharge space between the cathode and an intermediate mesh electrode. High voltage pulses are applied between such cathode and an anode on the opposite side of such mesh electrode to cause a first discharge between the cathode and mesh electrode through the starter gas, and a second discharge between the mesh electrode and the anode through the laser gas. The starter gas is a rare gas such as helium, while the laser gas may be a mixture of gases such as carbon dioxide, helium and nitrogen. Both the starter gas and laser gas may be at atmospheric pressure or higher and flow through the discharge spaces for cooling. The mesh electrode may extend over substantially the entire surface of the anode and is isolated from any source of electrical potential, at least during the first discharge. Such mesh electrode functions as an auxiliary cathode for the second discharge to excite a large volume of laser gas and produce a high power laser light pulse. This double discharge laser excitation technique reduces the required potential of the high voltage pulse and also provides a more uniform second discharge to excite a larger volume of laser gas than previous double discharge lasers.

20 Claims, 6 Drawing Figures

3,842,366
PATENTED OCT 15 1974
SHEET 1 OF 2
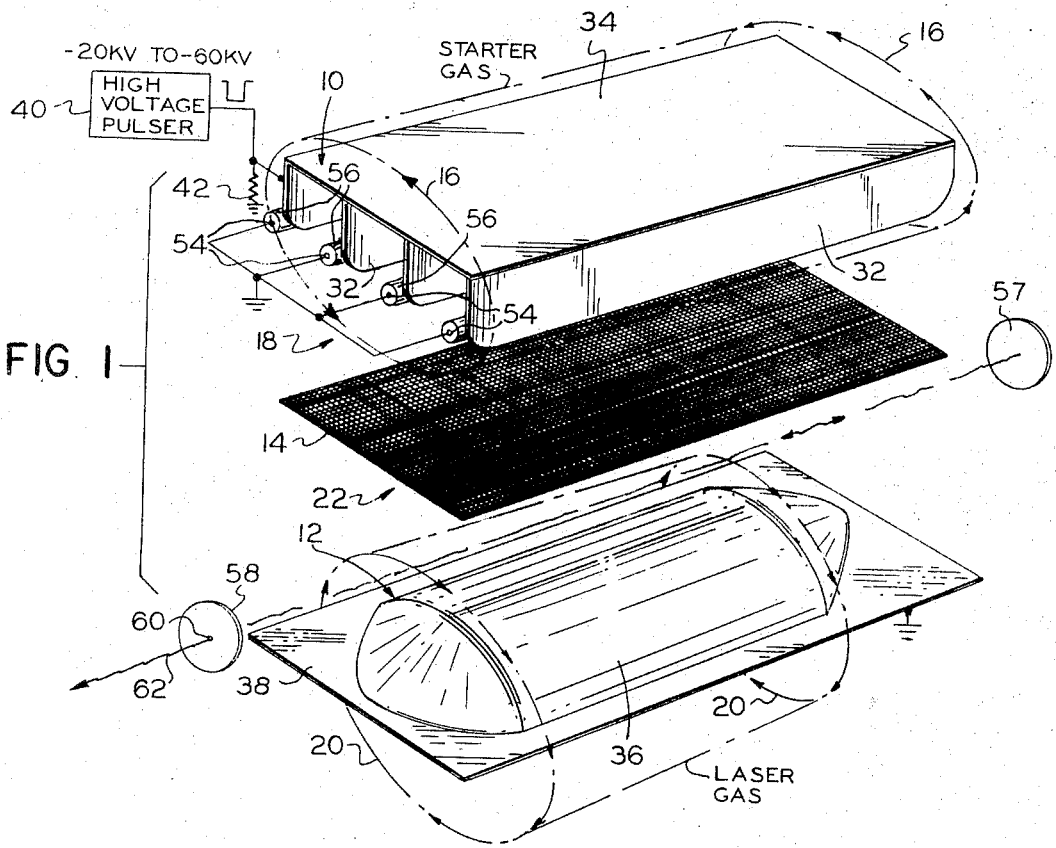
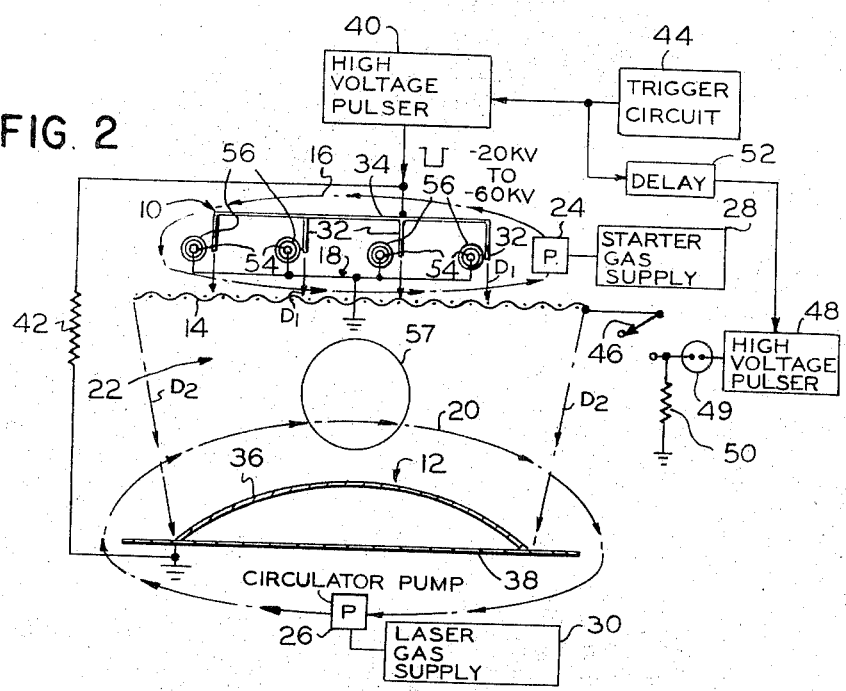

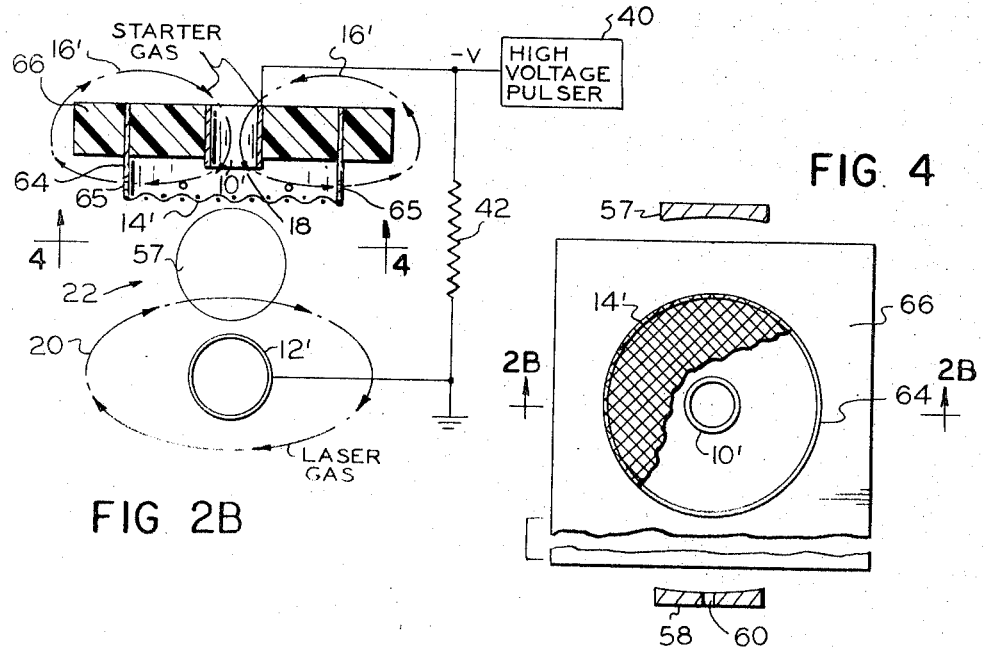
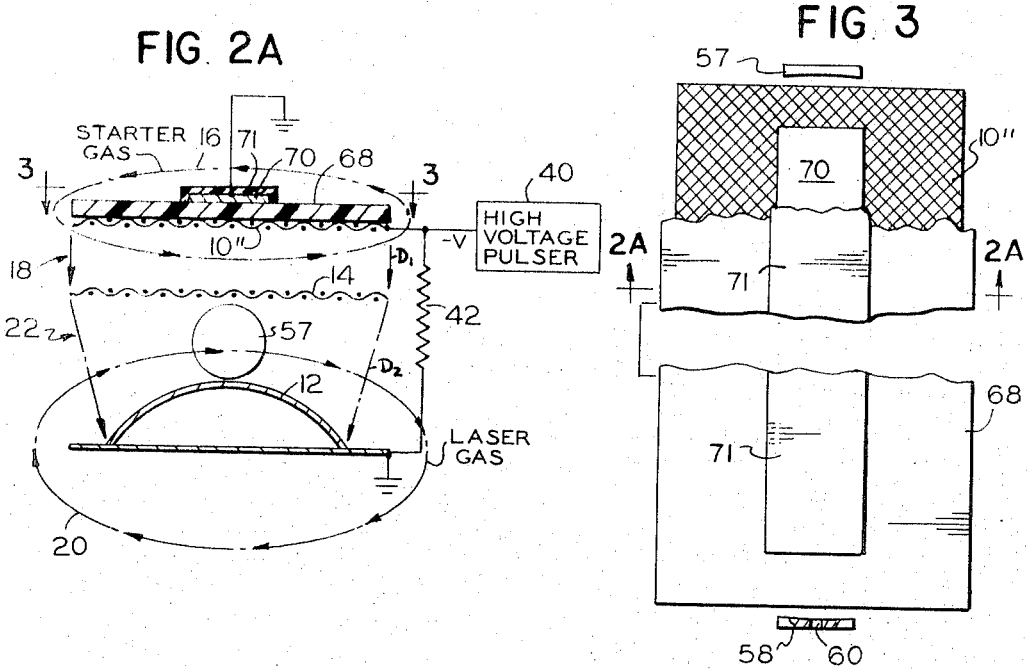

DOUBLE DISCHARGE, LARGE VOLUME EXCITATION GAS LASER

BACKGROUND OF THE INVENTION

The subject matter of the present invention relates generally to gas lasers and in particular to high voltage pulsed double discharge gas lasers having a first discharge space between a cathode and an intermediate mesh electrode, and a second discharge space between the mesh electrode and an anode. The mesh electrode is isolated from any source of electrical potential at least during the initiation of the first discharge and is of a larger area than the electron emitting surface of the cathode. A starter gas is provided in the first discharge space of a different composition than the laser gas provided in the second discharge space, and such gases are at atmospheric pressure or higher. This produces a more uniform second discharge from the mesh electrode in order to achieve a larger volume excitation of the laser gas and reduce the potential required for the high voltage pulses applied between the cathode and anode.

Previous large volume excitation gas lasers have been inefficient, including those employing a plurality of resistance loaded cathode pins uniformly spaced from a common anode rod, as shown in the article "Transversely Excited Atmospheric Pressure $CO_2$ Lasers" by A. J. Beaulieu, Vol. 16, No. 12, *Applied Physics Letters*, pgs. 504 and 505, published June 15, 1970. However, the electrical discharge through the laser gas is localized around each cathode pin and the discharge current is limited by the resistors to provide a "glow discharge" so that only a small portion of the gas is excited sufficiently to provide a laser action. In order to increase the volume of laser gas excitation, it has been proposed to make the cathode in the form of a grid or mesh and to apply high voltage pulses between the mesh cathode and a grounded anode while providing a grounded trigger electrode on the opposite sides of such mesh cathode from the anode. This provides a double discharge gas laser including a first discharge from the mesh cathode to the trigger electrode and a second discharge from the mesh cathode to the anode. Such a laser is shown in U.S. Pat. No. 3,662,284 of Beaulieu et al. granted May 9, 1972, and in the article "Double Discharge Excitation for Atmospheric Pressure $CO_2$ Lasers" by A. K. LaFlamme, in Vol. 41, No. 11, *The Review of Scientific Instruments*, pgs. 1,578 to 1,581, published November, 1970. However, this prior apparatus has the disadvantage that the discharges are not uniformly distributed over the surface of the mesh cathode. U.S. Pat. No. 3,402,367 of H. Kabayashi granted Sept. 17, 1968, shows a low voltage gas laser having a grounded mesh electrode between a cathode and a mesh anode cylinder around the laser cavity. Another large volume excitation gas laser operated by low D.C. voltage which employs a plurality of separate cathodes and isolated grids spaced along a common anode is shown in the article "Low Voltage $CO_2$ Laser Excitation" by G. Sedgwick et al., in Vol. 9, No. 12, *Applied Optics*, pgs. 2,737 to 2,741, published December, 1970. However, these low voltage lasers have limited light output because the laser gas is below atmospheric pressure.

These problems have been overcome in the double discharge gas laser of the present invention by employing a separate starter gas of different composition than the laser gas in a first discharge space between the cathode and an intermediate mesh electrode. The mesh electrode is "floating" or isolated from any source of potential, at least during initiation of the first discharge between the cathode and such mesh electrode. The second discharge occurs through the laser gas between the mesh electrode and the anode, such mesh electrode then serving as an auxiliary cathode of large area to excite a large volume of laser gas which is at atmospheric pressure or higher. The second discharge is distributed more uniformly over the large area surface of the mesh electrode without localized arcing apparently because the cathode potential is more rapidly transferred by the ionized starter gas to the mesh electrode and ultraviolet light emitted from the ionized starter gas is transmitted through the mesh electrode to partially ionize the laser gas.

SUMMARY OF THE INVENTION

It is, therefore, one object of the present invention to provide an improved double discharge excitation gas laser.

Another object of the invention is to provide such a laser in which a starter gas of different composition than the laser gas is employed in a first discharge space between the cathode and an intermediate mesh electrode, such laser gas being provided in a second discharge space between such mesh electrode and the anode.

A further object of the invention is to provide such a laser in which the mesh electrode extends over substantially the entire length of the anode, and is isolated from any source of electrical potential at least during the initiation of the first discharge from the cathode to the mesh electrode.

An additional object of the invention is to provide such a laser in which the second electron discharge between the mesh electrode and the anode is more uniformly distributed over the surfaces of the electrodes and thereby excites a larger volume of laser gas and produces laser light output pulses of greater power.

Still another object of the present invention is to provide such a laser apparatus employing laser gas at atmospheric pressure, or greater, flowing through the second discharge space while the starter gas flows through the first discharge space.

A still further object of the invention is to provide such a laser in which a second high voltage pulser is connected to the mesh electrode after the initiation of the first discharge to increase the electron current of the second discharge.

BRIEF DESCRIPTION OF DRAWINGS

Other objects and advantages of the present invention will be apparent from the following detailed description of certain preferred embodiments thereof and from the attached drawings of which:

FIG. 1 is an exploded oblique perspective view of one embodiment of the double discharge gas laser apparatus of the present invention;

FIG. 2 is a vertical section view of the laser apparatus of FIG. 1;

FIG. 2A is a vertical section view taken along the line 2A—2A of FIG. 3 showing a second embodiment of the laser apparatus of the invention similar to that of FIG.

2, but which employs a different cathode and trigger electrode;

FIG. 2B is a vertical section view taken along the line 2B—2B of FIG. 4 showing a third embodiment of the laser apparatus of the present invention employing a still different cathode arrangement;

FIG. 3 is a horizontal section view taken along the line 3—3 of FIG. 2A with parts broken away for clarity; and FIG. 4 is a horizontal section view taken along the line 4—4 of FIG. 2B.

DESCRIPTION OF PREFERRED EMBODIMENTS

As shown in FIGS. 1 and 2, one embodiment of the double discharge gas laser of the present invention is a transversely excited atmospheric pressure (TEA) laser including a cold cathode 10, an anode 12 and an intermediate mesh electrode 14 positioned between such cathode and anode. A starter gas 16 flows through a first discharge space 18 between the cathode 10 and the mesh electrode 14, such as in the counterclockwise direction of arrows 16. A laser gas 20 of different composition than such starter gas flows through a second discharge space 22 between the mesh electrode 14 and the anode 12, such as in the clockwise direction of arrows 20. Thus, the starter gas 16 and the laser gas 20 both flow in the same general direction adjacent to the mesh electrode 14 on opposite sides thereof so that there is very little mixing of such gases. Any suitable rare gas such as helium, neon, krypton, xenon or argon may be employed for the starter gas, while any suitable laser gas may be employed including a mixture of carbon dioxide, helium, and nitrogen. The gases 16 and 20 are at atmospheric pressure or greater and are circulated by pumps 24 and 26 connected, respectively, to a starter gas supply 28 and a laser gas supply 30, which make up for any leakage of gas from the container (not shown) of the laser apparatus.

The cathode 10 includes a plurality of cathode blades 32 spaced apart about 0.625 inch and made of aluminum or copper approximately 11 inches long by 1 inch high by 0.01 inch thick, which extend longitudinally along the anode 12. The cathode blades 32 may be joined together at their top edges by the common metal support plate 34, or such cathode blades and support plate may be formed integral from a single piece of extruded aluminum. The anode 12 may be formed of a portion of a hollow aluminum pipe or it may be formed as shown in FIG. 1 by a cylindrical member 36 which is secured by welding to a flat support plate 38. The cylindrical anode member 36 is a small arc portion of a cylinder having a 2 inch radius, and the opposite ends of the anode cylinder 36 are rounded in the axial direction to prevent discharges from concentrating at such ends. The mesh electrode 14 is a woven grid of stainless steel wires of 100 lines per inch mesh size. The anode 12 is spaced from the mesh electrode 14 a distance of about 1.2 inches, while the mesh electrode is spaced from the cathode blades 32 a distance of about 0.36 inch.

A high voltage pulser 40 of any suitable type, such as a Marx surge pulser or a simple capacitor discharge pulser, is connected at its output to apply high voltage pulses between the cathode 10 and the anode 12. In the embodiment shown in FIG. 2, the anode 12 is grounded and is connected to the cathode 10 through a ballast resistor 42. The high voltage pulser 40 applies a negative high voltage pulse having a peak amplitude of between −20 kilovolts to −60 kilovolts to the cathode 10 and the upper terminal of the ballast resistor. The high voltage pulser 40 may be triggered at a predetermined repetition rate with trigger pulses produced by a trigger circuit 44 connected to such pulser in a known manner. For example, the trigger circuit may trigger spark gaps in the input stages of the Marx surge generator or the spark gap discharging the capacitor of the capacitor discharge pulser.

In one embodiment, the mesh electrode 14 is "floating" in potential and isolated from any source of electical potential, at least during the initiation of a first electron discharge $D_1$, from the cathode 10 to such mesh electrode. The mesh electrode extends along the entire length and over the entire surface of the anode 12. Thus, upon receipt of a high voltage pulse at the cathode 10, the first electron discharge $D_1$ occurs between the bottom edge of the cathode blades 32 and the mesh electrode 14 through the starter gas 16 in the first discharge space 18. As a result, the starter gas which may be, for example, helium, is ionized and the potential of the cathode is rapidly transferred to the mesh electrode 14 and uniformly distributed over the entire surface of such mesh electrode due to the fact that it is made of conducting material. Ultraviolet light radiation is emitted from the ionized starter gas through the mesh electrode 14 into the second discharge space 22 where such ultraviolet light apparently at least partially ionizes the laser gas. As a result, a second electron discharge $D_2$ takes place between the mesh electode 14 and the anode 12 after the first discharge, which is more uniformly distributed over the surface of the mesh electrode and the anode. Thus, it is believed that the ionized starter gas rapidly transfers the cathode potential to the mesh electrode and the ultraviolet radiation emitted from the starter gas partially ionized the laser gas to cause the second discharge to take place before any localized arcing takes place. It should be noted that the anode cylinder 36 curves away from the outer edges of the mesh electrode 14 to prevent the second discharge from concentrating at the outer edge of such mesh electrode. However, it is also possible to employ a flat anode if the mesh electrode 14 was curved away from such anode instead of being a flat mesh electrode as shown.

A normally open switch 46 may be employed to connect the mesh electrode 14 to the output of a second high voltage pulser 48 to supply additional current to the mesh electrode during the second discharge $D_2$ when such switch is moved from the open position shown to the closed position. In the open position of the switch 46, the mesh electrode 14 is floating or isolated from any source of electrical potential. However, in the closed position of switch 46 the second high voltage pulser 48 can apply a second negative high voltage pulse across a second ballast resistor 50 and to the mesh electrode 14 immediately after the initiation of the first discharge $D_1$ in order to increase the current flowing in the second discharge $D_2$. Thus, the switch 46 may be connected to the output of the second pulser 48 through a spark gap 49 which breaks down only upon the application of the second high voltage pulse by the pulser 48 when it is triggered. In order to trigger the second high voltage pulser 48 immediately after the first pulser 40 is triggered, the output trigger pulse of trigger circuit 44 is transmitted through a delay line 52 before reaching such second pulser. As a result, the second high voltage pulser 48 does not apply a negative output pulse to the mesh electrode 14 until after the first discharge has been initiated.

A plurality of insulated trigger electrodes 54 are provided adjacent to the bottom edges of the cathode blades 32 to produce the first discharge $D_1$ when the pulser 40 has lower voltage pulses of about −20 kilovolts to −35 kilovolts. The trigger electodes may be in the form of wires 54 contained within glass envelopes 56 which insulate such trigger electrodes from the cathode blades by solid insulating material, and prevent any arc discharge between the cathode blades and the trigger electrodes. Each of the trigger electrodes 54 is positioned closer to one of the cathode blades 32 than the other blades, and all of such trigger electrodes are grounded. As a result of the presence of the trigger electrodes in horizontal alignment with the lower ends of the cathode blades 32, electrons are emitted from such blades, apparently initially by field emission due to the strong electrical field produced between the trigger electrode and the cathode blade edges. This starts the ionization of the starter gas and produces the first discharge between the cathode blades 34 and the mesh electrode 14.

The laser apparatus of FIGS. 1 and 2 is provided with the usual pair of light reflecting mirrors 56 and 58 at the opposite ends of the laser cavity. The inner surface of the rear mirror 56 may have a radius of curvature on the order of 10 meters while the front mirror 58 has a radius of curvature of about 1.43 meters. In addition, a light output opening 60 of one-eighth inch diameter is provided in the center of the front mirror 58 in order to transmit laser light output pulses 62 from the laser apparatus. In the embodiment shown, the mirrors 56 and 58 may be separated by a distance of about 1 meter. Also it should be noted that the mirrors are made of metal and may be warmed to a temperature of about 100° F. to prevent damage by the laser light pulses and the heated laser gas.

The laser gas can be a mixture of one part carbon dioxide, one part nitrogen and 15 parts helium which are provided at flow rates of 5 standard cubic feet per hour (SCFH), for carbon dioxide, 5 SCFH for nitrogen and 75 SCFH for helium and mixed together before transmission through the circulator pump 26 to the second discharge space 22. The starter gas is helium and is transmitted through the pump 24 into the first discharge space 18 at a flow rate of 100 SCFH. Both the starter gas and the laser gas are preferably at atmospheric pressure or higher for more efficient light production. Of course other laser gas mixtures can be employed, such as one part carbon dioxide, one part nitrogen to ten parts helium, and other gaseous elements may be employed in such laser gas, such as carbon monoxide or xenon in place of the carbon dioxide. The high voltage pulser 40 may have a maximum pulse repetition rate of about 2,000 pulses per second at 30 kilovolts. The active volume of 0.118 liter of excited laser gas is achieved in the example given with second discharge space dimensions of 25 centimeters by 1.6 centimeters by 2.95 centimeters.

Another embodiment of the laser apparatus of the present invention is shown in FIGS. 2B and 4, and is similar to that previously described, except that it employs a hollow cylindrical cathode 10'. Such cathode 10' extends substantially at right angles to the axis of a cylindrical anode 12'. The mesh electrode 14' is in the form of a circular sheet supported between the cathode and anode on the end of a glass support cylinder 64 surrounding the cathode 10'. The cathode 10' and the support cylinder 64 are both embedded in a support plate 66 of plastic insulating material. In this embodiment, the starter gas 16' is circulated through the center of the cylindrical cathode 10', into the first discharge space 18, and around the outside edge of the support plate 66. While the starter gas in the embodiment shown in FIG. 2B may pass through the mesh electrode 14' and into the second discharge space 22 before returning, it is more desirable to provide vent openings 65 in the side of the support cylinder 64 so that the starter gas remains in the first discharge space 18 and does not mix with the laser gas to cause undesirable turbulence of such laser gas.

In one example, the cathode 10' of FIG. 2B has an outer diameter of five-eighths inch, and the mesh electrode 14' is 1 inch in diameter, while the anode 12' is 1 inch in diameter, and is spaced from the mesh electrode a distance of about 1 inch. The length of the anode 12' can be approximately the same as the diameter of the mesh electrode 14' when a single cathode is employed. However, it is also possible to provide a plurality of cathodes 10' and associated mesh electrodes 14' on support cylinders 64 spaced along the length of an elongated anode, as represented by the break in the support plate 66 in FIG. 4. All of such cathodes are connected in common to the output of the high voltage pulser 40. In other respects the laser apparatus of FIG. 2B and FIG. 4 is similar to that of FIGS. 1 and 2, previously described. Thus, a plurality of grounded trigger electrodes similar to the glass enclosed wires 54 and 56 of FIG. 2 can be employed adjacent to the lower end of the cathode cylinders 10' for ionizing the starter gas 16' when lower voltage output pulses are provided by the pulser. It should be noted that the need for the trigger electrodes depends upon the spacing between the cathode and anode, and for example, at a spacing of 5 centimeters, such trigger electrodes are required when the output pulse of pulser 40 is below about 33 kilovolts.

FIGS. 2A and 3 show a third embodiment of the laser of the present invention, which is similar to that of FIGS. 1 and 2, except that the cathode 10" is a mesh cathode, such as woven wire mesh of 250 lines per inch mesh size of stainless steel or nickel. The mesh cathode is supported on the opposite side of a plastic insulating plate 68 from a modified trigger electrode 70. The trigger electrode 70 is in the form of a flat, rectangular metal strip coated on the upper surface of the insulating plate 68 and is provided with a covering layer 71 of plastic insulating material. The trigger electrode is of narrower width and slightly shorter length than the mesh cathode 10" so that it is completely insulated therefrom by the solid insulating material of plate 68. In a similar manner to the trigger electrode 54 of FIG. 2, the trigger electrode 70 is grounded and causes a high electrical field to be produced adjacent the grid wires of the mesh cathode 10" in order to partially ionize the starter gas 16 flowing through the first discharge space 18 between the mesh electrode 14 and such cathode. As a result, a substantially uniform first discharge takes place between the mesh cathode 10" and the intermediate mesh electrode 14, which rapidly drives such intermediate mesh electrode to the cathode potential when negative high voltage pulses are applied to such cathode by pulser 40. The second discharge then occurs through the laser gas 20 in space 22 between the intermediate mesh electrode 14 and the anode 12.

It will be obvious to those having ordinary skill in the art that many changes may be made in the above-described preferred embodiment of the present invention without departing from the spirit of the invention. For example, other cathode structures can be employed, such as crossed blades forming an egg crate-like structure. Therefore, the scope of the present invention should only be determined by the following claims.

We claim:

1. Gas laser apparatus in which the improvement comprises:
    an anode;
    a cathode including at least one electron emitting element;
    an intermediate electrode supported in spaced relationship between said anode and said cathode;
    gas means for providing a starter gas in a first discharge space between said cathode and said intermediate electrode, and for providing a laser gas in a second discharge space between said intermediate electrode and said anode, said laser gas being of a different composition than said starter gas; and discharge means for producing a first electrical discharge between said cathode and said intermediate electrode through said starter gas, and for producing a second electrical discharge between said intermediate electrode and said anode through said laser gas to cause the laser apparatus to produce a laser light beam output.

2. Laser apparatus in accordance with claim 1 in which the intermediate electrode is a porous mesh electrode of larger area than the electron emitting surface of said cathode.

3. Laser apparatus in accordance with claim 2 in which the starter gas is of a gas composition which emits ultraviolet light when it is ionized by the first discharge so that said ultraviolet light is transmitted through the mesh electrode into the laser gas.

4. Laser apparatus in accordance with claim 2 in which the discharge means includes a high voltage pulser means for applying high voltage pulses between said cathode and said anode, and said intermediate mesh electrode is isolated from any source of electrical potential at least at the time said first discharge is initiated.

5. Laser apparatus in accordance with claim 4 which also includes a second high voltage pulser means for applying high voltage pulses between said mesh electrode and said anode after said first discharge is initiated.

6. Laser apparatus in accordance with claim 1 which includes means for causing the starter gas and the laser gas, respectively, to flow through the first discharge space and the second discharge space on opposite sides of the intermediate electrode, and to provide said gasses with pressures at least as great as atmospheric pressure.

7. Laser apparatus in accordance with claim 2 which includes means for causing the starter gas and the laser gas to flow in the same general direction past the opposite sides of the mesh electrode.

8. Laser apparatus in accordance with claim 1 in which the laser gas is a mixture of gases at least one of which is not present in the starter gas.

9. Laser apparatus in accordance with claim 8 in which the starter gas is helium and the laser gas is a mixture of carbon dioxide, helium and nitrogen.

10. Laser apparatus in accordance with claim 2 in which the cathode includes a plurality of spaced emitting elements which are uniformly spaced from the mesh electrode, and the anode is curved so that its outer edges are spaced a greater distance from the mesh electrode than its central portion is spaced.

11. Laser apparatus in accordance with claim 10 which also includes a trigger means comprising a plurality of trigger electrodes positioned adjacent different ones of said cathode emitting elements, connected to a more positive potential than said cathode, and insulated therefrom by solid dielectric material.

12. Gas laser apparatus in which the improvement comprises:
    an anode;
    a cathode including at least one electron emitting element;
    a mesh electrode of larger area than the electron emitting surface of said cathode and said anode
    means for supporting said mesh electrode between said cathode and said anode with said mesh electrode extending along substantially the entire length of said anode;
    gas means for providing laser gas in the space between said mesh electrode and said anode;
    high voltage pulser means having its output connected between said cathode and said anode for producing a first electrical discharge between said cathode and said mesh electrode and for producing a second electrical discharge between said mesh electrode and said anode to excite a large volume of said laser gas and cause the laser apparatus to produce a laser light beam output; and
    said mesh electrode being isolated from any source of electrical potential at least at the time said first discharge is initiated.

13. Laser apparatus in accordance with claim 12 in which the gas means provides a starter gas in the space between the cathode and the mesh electrode, said starter gas being of a different composition than said laser gas.

14. Laser apparatus in accordance with claim 13 which includes means for causing the starter gas and the laser gas, respectively, to flow through the first discharge space and the second discharge space on opposite sides of the mesh electrode, and to provide said gases with pressures at least as high as one atmospheric pressure.

15. Laser apparatus in accordance with claim 13 which includes means for causing the starter gas and the laser gas to flow in the same general direction past opposite sides of mesh electrodes, and to cause said laser gas to flow transverse to the axis of said laser light beam.

16. Laser apparatus in accordance with claim 13 in which the starter gas is a gas composition which emits ultraviolet light when ionized by said first discharge so that said ultraviolet light is transmitted through the mesh electrode into the laser gas.

17. Laser apparatus in accordance with claim 12 which also includes trigger means comprising at least one trigger electrode positioned adjacent the emitting element of said cathode and connected to a more positive voltage potential than said cathode but insulated from the emitting element by a solid insulator member to prevent an electrical discharge between the cathode emitting element and said trigger electrode.

18. Laser apparatus in accordance with claim 17 in which the cathode has a plurality of spaced emitting elements and the trigger means includes a plurality of trigger electrodes positioned adjacent different ones of said emitting elements.

19. Laser apparatus in accordance with claim 12 which also includes a second high voltage pulser means having its output connected to the mesh electrode through a normally open isolation switch which is closed to apply high voltage pulses between said mesh electrode and said anode after the initiation of said first discharge.

20. Laser apparatus in accordance with claim 12 in which the cathode is a mesh cathode and an electrical insulator is provided between said mesh cathode and a trigger electrode of more positive potential on the opposite side of said cathode from said mesh electrode.

* * * * *